United States Patent [19]

Völker et al.

[11] 4,118,199
[45] Oct. 3, 1978

[54] MONOLITHIC CARRIER CATALYST AND ARRANGEMENTS OF SUCH A CATALYST FOR THE PURIFICATION OF EXHAUST GASES FROM AN INTERNAL COMBUSTION ENGINE

[75] Inventors: Herbert Völker, Hanau; Edgar Koberstein, Alzenau; Jörg Hensel, Hanau, all of Germany

[73] Assignee: Deutsche Gold- und Silber-Scheideanstalt vormals Roessler, Frankfurt am Main, Germany

[21] Appl. No.: 724,428

[22] Filed: Sep. 17, 1976

[30] Foreign Application Priority Data

Sep. 23, 1975 [DE] Fed. Rep. of Germany ....... 2542282
Dec. 3, 1975 [DE] Fed. Rep. of Germany ....... 2554359

[51] Int. Cl.² .................. B01J 8/00; F01N 3/15
[52] U.S. Cl. ......................... 422/171; 252/477 R; 422/180
[58] Field of Search ........ 23/288 F, 288 FB, 288 FC; 423/213.2, 213.5, 403; 252/477 R

[56] References Cited

U.S. PATENT DOCUMENTS

| | | | |
|---|---|---|---|
| 1,452,145 | 4/1923 | Cederberg | 423/403 X |
| 2,664,340 | 12/1953 | Houdry | 423/213.5 |
| 3,259,453 | 7/1966 | Stiles | 423/213.7 |
| 3,410,651 | 11/1968 | Brandenburg et al. | 23/288 F |
| 3,785,781 | 1/1974 | Hervert et al. | 23/288 F |

Primary Examiner—Morris O. Wolk
Assistant Examiner—Roger F. Phillips
Attorney, Agent, or Firm—Beveridge, DeGrandi, Kline & Lunsford

[57] ABSTRACT

In a monolithic carrier catalyst containing a catalytically active substance for the purification of a stream of exhaust gases from an internal combustion engine, the improvement comprises providing an increasing concentration of catalytically active substance on the monolithic carrier catalyst, wherein the concentration increases in the direction of flow of the exhaust gases. The catalyst is particularly useful in oxidizing and/or reducing the noxious substances in automotive exhaust gases.

9 Claims, 6 Drawing Figures

MONOLITHIC CARRIER CATALYST AND ARRANGEMENTS OF SUCH A CATALYST FOR THE PURIFICATION OF EXHAUST GASES FROM AN INTERNAL COMBUSTION ENGINE

BACKGROUND OF THE INVENTION

This invention relates to a monolithic carrier catalyst and an arrangement of such catalysts, wherein the catalysts are well known in the art. The catalyst of this invention is useful in the catalytic purification of exhaust gases from internal combustion engines, and makes it possible to avoid premature catalyst aging resulting from damage of the catalytically active phases, especially where such damage is caused by catalyst poisons.

The exhaust gases emitting from a continuously increasing number of motor vehicles has caused a very real air pollution problem. Of utmost importance in the solution of this problem are catalytic processes wherein noxious substances are converted by catalytic action into substances that can be tolerated in the atmosphere. The catalysts employed in such processes must meet stringent requirements, such as catalytic effectiveness, long duration of catalytic action and mechanical stability. In addition to pellet catalysts, above all monolithic carrier catalysts have been employed. These monolithic carrier catalysts can be produced from cordierite, mullite, aluminum oxide, silicon carbide or metal alloys. These monolithic carrier catalysts are characterized by a honeycomb structure and comprised of channels running parallel to the direction of flow of the exhaust gases. The monoliths cause no significant loss of pressure; however, the cross-section of the channel and the shape of the channel can influence the flow of the exhaust gas and thus the catalytic effectiveness of the system.

The catalytically active substances, such as noble metals, oxidic compounds or combinations of these substances, are well known in the art, and are generally applied in thin layers on the monolithic carrier. Low surface area skeleton bodies can be provided with a very thin, high surface area intermediate carrier layer in order to assure better distribution of the catalytically active phase on the carrier body. The oxides of copper, chromium, manganese, iron, cobalt, nickel and mixtures of these substances, such as copper chromite, are well known for use as non-noble metal catalytically active compounds. Among the catalytically active noble metals that can be employed are platinum, palladium, rhodium and ruthenium. It is also known that non-noble metals can be doped with the noble metals, or vice versa. Similarly, compounds of non-noble metals and noble metals can also be employed. In many cases, relatively small quantities of other elements can be added to the noble metals and non-noble metals mentioned above. These other elements are termed promoters for the improvement of certain characteristics of the catalyst system. Among these other elements are alkaline earth metals, such as magnesium, calcium, strontium or barium; rare earth, such as samarium, lanthanum and cerium; and elements from the fourth group of the periodic system, such as titanium and tin. It is known that the catalytically active phases can change during operation because of aging of the catalyst or poisoning of the catalyst.

The effectiveness of the catalyst can be reduced by relatively high operating temperatures, but above all by the fuel and motor oil additives or their decomposition products. Typical of such harmful substances are lead alkyl compounds (anti-knock agents), halogen alkyls, phosphorus, sulfur and zinc compounds. Genuine catalyst poisoning can result when lead compounds, which are contained in the exhaust gases in the form of aerosols, damage noble metal-containing catalysts.

There exists a need in the art for a monolithic carrier catalyst or arrangement of monolithic carrier catalysts for the purification of exhaust gases from internal combustion engines, whereby the catalyst is not subjected to premature aging and catalyst poisoning.

SUMMARY OF THE INVENTION

This invention aids in fulfilling this need in the art by providing an improved monolithic carrier catalyst containing a catalytically active substance for the purification of a stream of exhaust gases emitting from an internal combustion engine by passing the stream of exhaust gases through the monolith and in contact with the catalytically active substance. More particularly, the improvement comprises providing the catalyst with an increasing concentration of catalytically active substance, wherein the concentration increases in the direction of flow of the exhaust gases. The catalytically active substance is well known in the art, and can be of a type previously described. The monolithic carrier catalyst of this invention can be comprised of a single monolith or at least two monoliths arranged in series through which the exhaust gases flow, wherein the second and subsequent monoliths each have a higher content of catalytically active substance than the immediately preceding monolith. The essence of this invention comprises providing the monolithic carrier catalyst with an increasing concentration of catalytically active substance in the direction of flow of the exhaust gases.

BRIEF DESCRIPTION OF THE DRAWINGS

This invention will be more fully understood by reference to the Figures in which.

DETAILED DESCRIPTION OF THE INVENTION

Figure 1:
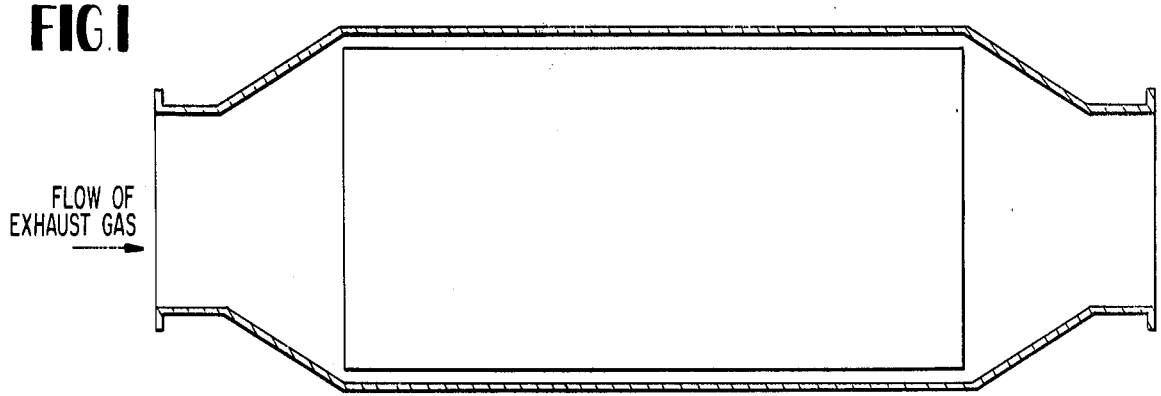
FIGS. 1, 3 and 5 depict monolithic carrier catalysts of this invention.

The catalyst of this invention is characterized by having a positive gradient of catalytically active substance in the direction of flow of the exhaust gas. As used herein, the term "positive gradient" means that the amount of catalytically active substance increases over the length of the catalyst system, and can be conveniently expressed as the increase in weight percentage of catalytically active substance per unit of length. Depending upon the purpose of use and method of production of the monolithic carrier catalyst, the magnitude of the gradient can vary over the catalyst system or even within a single monolith. Thus, for example, the gradient can be very small at the inflow end of a monolith and can increase toward the outflow end. The gradient can be within an order of magnitude of $6 \times 10^{-5}\%$ per mm to $3 \times 10^{-1}\%$ per mm, preferably $6 \times 10^{-4}\%$ per mm to $3 \times 10^{-2}\%$ per mm.

In a preferred embodiment of this invention, two or more catalysts are connected in series. Each of the catalysts can be provided with a different gradient for the amount of catalytically active substance. This arrangement has considerable flexibility in design and use. For example, three monolithic catalysts can be arranged so that the last catalyst has a low gradient for the content of catalytically active phases, the second one a medium gradient and the third a high positive gradient. Arrangements consisting of two individual catalyst monoliths are preferred, but in special cases up to four or more catalyst units can be connected in series.

The individual catalyst monoliths can be coated with active phases or active substances of the same or different composition. This will permit the optimum utilization of different effects of individual catalysts; for example, starting temperature and degree of conversion of toxic substances can be tailored to suit a given application.

Another modification provided by this invention comprises an arrangement of monolithic carrier catalysts of the type well known in the art, each having a homogeneous distribution of the content of active phases or active substances, whereby at least two catalysts are series-connected in the direction of flow of the exhaust gases in such a way that the rear (trailing) catalyst has a higher content of active phases than the one positioned in front of it. Such as arrangement likewise utilizes the concept of the present invention by providing a rising content of active phases in the direction of the flow of exhaust gases, and thus utilizes a positive gradient for the content of active phases along the catalyst arrangement. It will be appreciated that an arrangement of this type can be comprised of three monolithic catalysts, wherein the first catalyst has a low concentration of active substance, the second catalyst a medium concentration and the final, terminal catalyst a high concentration of catalytically active substance. In this case, however, it is to be understood that the active substance can be distributed homogeneously over the length of one catalyst or each catalyst in this arrangement. In the case of this embodiment also, the individual catalyst can be coated with active phases of the same or different composition of substances in order to achieve an optimum effect of the overall arrangement.

It will be appreciated that the ultimate use will dictate, in part, whether for a given catalyst arrangement, in which two to four or more catalysts can be employed, one combines catalysts with variable gradients for the content of active phases or catalyst units with uniform coating of active substances, or finally, according to a further embodiment of this invention, whether one employs both in combination, that is to say the type of catalyst known in the art and a catalyst of the type provided by this invention.

It has been found in vehicles subjected to continuous tests that the substances from fuel and oil that poison catalysts are deposited in greatest quantities in the area of entry of the exhaust gas into the monolithic carrier catalyst. Therefore, there is an essentially stronger deactivation in the entry area than in areas lying further downstream. Accordingly, the monolithic carrier catalyst of this invention is advantageous because smaller quantities of active phases become catalytically ineffective after contacting the poisonous substances. Since the deactivation takes place considerably slower in the rear area of the catalyst of this invention, and takes place to a considerably smaller extent in this area, more of the active phase is available for a longer period of time for catalytic purification. Therefore, the useful life of the catalysts of the present invention is considerably longer than that of the known catalysts.

Furthermore, since the concentration of active phases increases in the direction toward the exit of the catalyst of this invention, an overall increase in the effectiveness of the catalyst can be realized. This is true even with a decreasing concentration of combustible substances in the exhaust gas, which is accompanied by increasingly more difficult conversion conditions, because an increasing concentration of catalytically active centers becomes available, and this at least partially compensates for the usual decrease in conversion.

Figure 2:
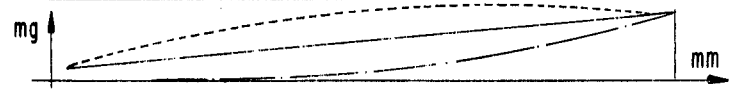
FIGS. 2, 4 and 6 are graphic representations depicting the distribution of catalytically active substances in the catalysts of FIGS. 1, 3 and 5, respectively.

With reference to the Figures, FIG. 1 depicts a monolithic carrier catalyst according to this invention, wherein the monolith is disposed in a catalyst housing. FIG. 2 is a graphic presentation of typical curves showing the distribution of the content of catalytically active phases of the catalyst shown in FIG. 1. As will be seen in FIG. 2, the catalyst has a positive gradient of catalytically active phases.

Figure 3:
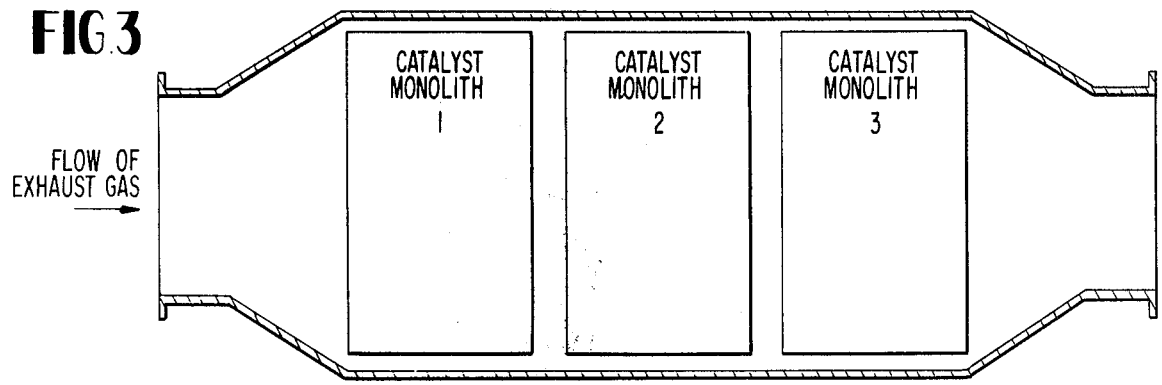
Figure 4:

FIG. 3 shows an arrangement of three monolithic carrier catalysts according to this invention. A graphic presentation of typical distribution curves for the catalytically active substances of these catalysts is shown in FIG. 4. Again, catalysts with positive gradients of catalytically active substances are shown.

Figure 5:
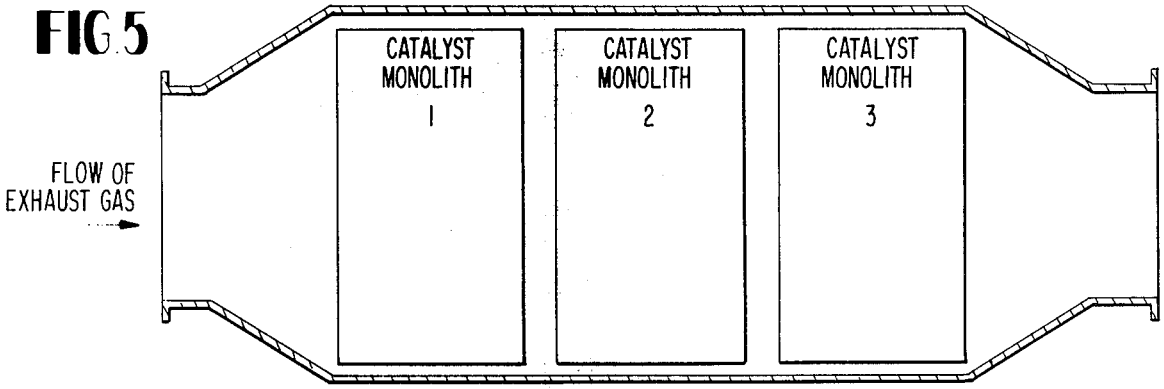
Figure 6:
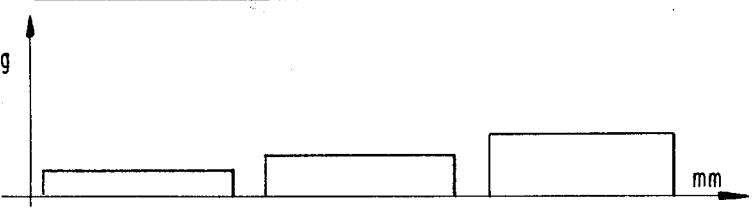

In FIG. 5, there is shown a schematic presentation of an arrangement according to this invention in which monolithic carrier catalysts are arranged in a housing, wherein the catalysts have a homogeneous distribution of the content of catalytically active phases in the direction of flow of the exhaust gas. The catalysts in FIG. 5 are arranged in series. A graphic presentation of the content of catalytically active phases of the individual monolithic catalysts shown in FIG. 5 is depicted in FIG. 6. In FIG. 5, the catalyst 2 has a higher content of homogeneously distributed active phases than catalyst 1. The catalyst 3, in turn, has a higher content of homogeneously distributed active phases than the catalyst 2.

This invention will be more fully understood with reference to the following Examples in which all parts, proportions, percentages and ratios are by weight, unless otherwise indicated.

EXAMPLE 1

In order to determine the content of active phase, a monolithic carrier catalyst of 150 mm length produced by means of a dipping process is divided into 10 segments each having a length of 15 mm. These segments have the following platinum content expressed in percent by weight: S

| | |
|---|---|
| segment 1 | 0.5 |
| segment 2 | 0.28 |
| segment 3 | 0.22 |
| segment 4 | 0.21 |
| segment 5 | 0.20 |
| segment 6 | 0.20 |
| segment 7 | 0.21 |
| segment 8 | 0.26 |
| segment 9 | 0.28 |
| segment 10 | 0.74. |

In a test for conversion, this catalyst in its fresh state gives:

|  | Degree of Conversion |
| --- | --- |
| CO max. | 98.04% |
| HC max. | 77.33%. |

The results of the degree of conversion in percent are obtained from the equation:

$$\frac{100 \times (\text{input concentration} - \text{output concentration})}{\text{input concentration}}$$

EXAMPLE 2

The monolithic carrier catalyst of Example 1 is divided between the segments 5 and 6. Both halves are disposed in series in an apparatus in such a way that the intersecting planes point counter to the direction of the flow of exhaust gas. The conversion test of the fresh catalysts resulted in:
 CO max 98.0%
 HC max 78.71%
The gradients (differences in content of Pt between the segments) in the direction of flow of exhaust gas amount to:
 + 0.01% by weight /15 mm and + 0.01% by weight /15 mm
 + 0.01% by weight /15 mm and + 0.05% by weight /15 mm
 + 0.06% by weight /15 mm and + 0.02% by weight /15 mm
 + 0.22% by weight /15 mm and + 0.46% by weight /15 mm.
Over their entire length, the two pieces of catalysts have a gradient of active phase of + 0.30% /75 mm and + 0.54% /75 mm.

EXAMPLE 3

A catalyst obtained according to Example 2 is aged over 100 hours at 720° C. of exhaust temperature on an engine and is subsequently subjected to a conversion test. 98.04 for CO max and 74.74% for HC max are found as degrees of conversion.

The behavior on starting, which results from the temperature at which previously determined quantities of conversion are achieved, serves as an additional figure of measurement for the quality of a catalyst for the purification of exhaust gases of internal combustion engines. The higher the temperature found, the worse will be the starting behavior of the catalyst.

For the aged catalyst, the following data of measurement were found for the behavior on start:
 50% CO → 324° C.
 90% CO → 339° C.
 50% HC → 336° C.
 70% HC → 391° C.

EXAMPLE 4

A monolithic carrier catalyst according to Example 1 is aged at 720° C. of exhaust gas temperature on an engine over 100 hours and is subsequently subjected to a conversion test. 98.0% are found for CO max and 71.35% for HC max. The behavior on starting is found as stated in Example 3.

The following data of measurement result from the aged catalyst:
 50% CO → 325° C.
 90% CO → 360° C.
 50% HC → 350° C.
 70% HC → 437° C.
Therefore, it will be readily appreciated from Examples 3 and 4 that the catalyst according to this invention as well as the apparatus of this invention have an improved aging and starting behavior characteristics.

EXAMPLE 5

A monolithic carrier catalyst of cordierite and 150 mm length, coated with active phase by means of the dipping process according to German OS 23 06 395, is divided into 7 segments of 21.4 mm of length each in order to determine the contents of active phase. These segments have the following platinum contents (% by weight):

| segment 1 | 0.185 |
| --- | --- |
| segment 2 | 0.172 |
| segment 3 | 0.170 |
| segment 4 | 0.168 |
| segment 5 | 0.172 |
| segment 6 | 0.174 |
| segment 7 | 0.21. |

For the entire catalyst monolith there results a platinum content of 1.65 g or 11 mg/mm, which, as can be seen from the above mentioned values, is distributed in almost uniform concentration over the entire catalyst monolith. In the case of the conversion test in its fresh state, the catalyst monolith produces the following values:
 CO max: 99%
 HC max: 80.5%
The starting behavior is characteristic for the catalyst. This results from the temperatures that are to be determined in the case of which 50% or 90% CO and 50% or 70% HC are converted. For the catalyst monolith of Example 5, the following values result for the starting behavior:
 50% C0 → 249° C.
 90% CO → 283° C.
 50% HC → 263° C.
 70% HC → 285° C.

EXAMPLE 6

Two monolithic carrier catalysts each of 75 mm length and coated with different active phases by means of a dipping process of German OS 23 06 395 are each divided into 4 segments of 18.75 mm length in order to determine the content of active phase. The following platinum contents were found:

| Monolith 1 | | Monolith 2 | |
| --- | --- | --- | --- |
| segment 1 | 0.197% by weight | segment 1 | 0.252% by weight |
| segment 2 | 0.193% by weight | segment 2 | 0.252% by weight |
| segment 3 | 0.194% by weight | segment 3 | 0.249% by weight |
| segment 4 | 0.210% by weight | segment 4 | 0.253% by weight |

For all the catalyst monoliths, platinum contents of 0.6 g or 8.28 mg/mm or 0.9 g or 12.41 mg/mm of catalyst length will result.

The catalyst monoliths 1 and 2 are attached to an exhaust gas purification device in such a way that the catalyst monolith 1 is disposed in the direction of flow of the exhaust gas in front of the catalyst monolith 2.

In the case of the conversion test in the fresh state, the following values result in the case of catalyst monoliths disposed in series:
 CO max 98%

HC max 80%.
For the starting behavior, the following temperatures were found:
50% CO → 239° C.
90% CO → 280° C.
50% HC → 261° C.
70% HC → 283° C.

EXAMPLE 7

The monolithic carrier catalyst of Example 5 is aged for 100 hours on an engine and subsequently it is subjected to a conversion test. The following values are found:
CO max 98%
HC max 74.3%.
For the starting behavior, the following temperatures were found:
50% CO → 343° C.
90% CO → 386° C.
50% HC → 360° C.
90% HC → 404° C.

EXAMPLE 8

The catalyst monoliths 1 and 2 disposed as in Example 6 are aged for 100 hours on an engine at 720° C. exhaust gas temperature.
In the case of the conversion test, the following values result:
CO max 98%
HC max 77.5%.
For the starting behavior, the following temperatures were found:
50% CO → 332° C.
90% CO → 355° C.
50% HC → 335° C.
70% HC → 365° C.

It is easy to gather from the Examples, that in the case of the apparatus of this invention, the catalyst monoliths have a better conversion and starting behavior after aging despite a low content of active phase, and that they therefore have longer duration of activity.

What is claimed is:

1. In a monolithic carrier catalyst containing a catalytically active substance for the purification of a stream of exhaust gases from an internal combustion engine whereby said stream flows through said monolith, said monolith carrier being contained in a container for said carrier, said exhaust gases being directed by said container to flow through said monolith carrier in one direction and in the desired orientation with regard to the carrier, the improvement which comprises having the catalytically active component deposited on said monolith carrier in a manner to create a positive gradient of the catalytically active substance with respect to the carrier and increasing in the direction of the flow of exhaust gases through said monolith carrier and being about $6 \times 10^{-4}$ to about $3 \times 10^{-2}$% per mm, expressed as the increase in weight percent of catalytically active substance per unit of length of said carrier over the entire length of said carrier.

2. In a catalyst according to claim 1 comprising in combination at least two monolithic carrier catalysts arranged in series in a container through which said stream flows, the improvement wherein at least one of said carriers has a positive gradient of catalytically active substance in the direction of flow of said stream through said carrier and at least one other of said carriers has a substantially homogeneous distribution of catalytically active substance.

3. In a catalyst according to claim 1 comprising at least two monolithic carrier catalysts arranged in series through which said stream flows, the improvement wherein the second and subsequent monoliths in said series in the direction of flow of exhaust gas each has a higher content of catalytically active substance that the immediately preceding monolith.

4. In a catalyst according to claim 2 wherein each of said monolithic carrier catalysts has a different positive gradient of catalytically active substance.

5. In a catalyst according to claim 2 wherein individual carriers are coated with different catalytically active substances.

6. In a catalyst according to claim 1 wherein said monolith is comprised of a multiplicity of substantially unobstructed, parallel channels through which said stream flows, said channels defined by rigid walls having a coating comprised of said catalytically active substance, wherein said substance is at least one oxide of a metal selected from the group consisting of copper, chromium, manganese, iron, cobalt, nickel and mixtures thereof.

7. In a catalyst according to claim 6 in which said coating includes a noble metal selected from the group consisting of platinum, palladium, rhodium and ruthenium, and oxides of said noble metals.

8. In a catalyst according to claim 6 in which said coating further includes at lease one metal selected from the group consisting of magnesium, calcium, strontium, barium, samarium, lanthanum, cerium, titanium and tin.

9. In a catalyst according to claim 1, the improvement which further comprises as an intermediate layer a thin, high surface area layer between said coating of catalytically active substance and the surface of the monolith for improving the distribution of catalytically active substance on said monolith.

* * * * *